United States Patent
Lee et al.

(10) Patent No.: US 10,020,999 B2
(45) Date of Patent: Jul. 10, 2018

(54) SYSTEM AND METHOD FOR VALIDATING BROADBAND SERVICE RECOMMENDATION

(71) Applicant: ADAPTIVE SPECTRUM AND SIGNAL ALIGNMENT, INC., Redwood City, CA (US)

(72) Inventors: Wooyul Lee, Palo Alto, CA (US); Manish Amde, Redwood City, CA (US); George Ginis, San Mateo, CA (US)

(*) Notice: Subject to any disclaimer, the term of this patent is extended or adjusted under 35 U.S.C. 154(b) by 47 days.

(21) Appl. No.: 15/022,752

(22) PCT Filed: Sep. 30, 2013

(86) PCT No.: PCT/US2013/062691
§ 371 (c)(1),
(2) Date: Mar. 17, 2016

(87) PCT Pub. No.: WO2015/047407
PCT Pub. Date: Apr. 2, 2015

(65) Prior Publication Data
US 2016/0234079 A1    Aug. 11, 2016

(51) Int. Cl.
*H04L 12/66* (2006.01)
*H04L 12/24* (2006.01)
(Continued)

(52) U.S. Cl.
CPC ...... *H04L 41/5012* (2013.01); *H04L 12/2856* (2013.01); *H04L 41/0896* (2013.01);
(Continued)

(58) Field of Classification Search
CPC ............ H04L 41/5012; H04L 43/0888; H04L 12/2856; H04L 41/5051; H04L 41/32;
(Continued)

(56) References Cited

U.S. PATENT DOCUMENTS

| | | | | |
|---|---|---|---|---|
| 7,515,691 | B2 * | 4/2009 | Warner | H04M 3/306 379/1.04 |
| 7,529,347 | B2 * | 5/2009 | Warner | H04Q 11/045 379/1.03 |

(Continued)

OTHER PUBLICATIONS

International Search Report & Written Opinion dated Jun. 24, 2014, for PCT Patent Application No. PCT/US13/62691.
(Continued)

*Primary Examiner* — Chuong T Ho
(74) *Attorney, Agent, or Firm* — North Weber & Baugh LLP

(57) ABSTRACT

Described are an apparatus, system, and method for method for validating a broadband service for recommendation. The method comprises: collecting data associated with the broadband service; evaluating the collected data for service recommendations, the service recommendations including upgrades and downgrades to the broadband service; and validating broadband service recommendations, in response to evaluating the collected data, before presenting the broadband service recommendations to user of the broadband service.

24 Claims, 6 Drawing Sheets

(51) Int. Cl.
*H04L 29/08* (2006.01)
*H04L 12/28* (2006.01)
*H04W 28/02* (2009.01)
*H04L 12/26* (2006.01)
*H04L 12/64* (2006.01)
*G06Q 30/02* (2012.01)

(52) U.S. Cl.
CPC .......... *H04L 41/32* (2013.01); *H04L 41/5051* (2013.01); *H04L 43/0888* (2013.01); *H04L 67/22* (2013.01); *H04L 67/30* (2013.01); *H04W 28/0226* (2013.01); *G06Q 30/0254* (2013.01); *H04L 41/0873* (2013.01); *H04L 41/5019* (2013.01); *H04L 41/5064* (2013.01); *H04L 43/50* (2013.01); *H04L 2012/6478* (2013.01)

(58) Field of Classification Search
CPC ..... H04L 41/0896; H04L 67/30; H04L 67/22; H04L 43/50; H04L 2012/6478; H04L 41/5064; H04L 41/5019; H04L 41/0873; H04W 28/0226; G06Q 30/0254
USPC ...... 370/351, 352, 353, 401; 379/1.03, 1.04, 379/399.01, 27.01
See application file for complete search history.

(56) References Cited

U.S. PATENT DOCUMENTS

| | | | | |
|---|---|---|---|---|
| 7,653,180 B2* | 1/2010 | Warner | ................ | H04M 3/306 379/1.03 |
| 8,631,136 B2* | 1/2014 | Tennyson | .............. | H04L 5/1446 703/21 |
| 2005/0123027 A1 | 6/2005 | Cioffi et al. | | |
| 2006/0072708 A1* | 4/2006 | Warner | ................ | H04Q 11/045 379/1.03 |
| 2006/0109979 A1* | 5/2006 | Afzal | .................... | H04M 3/306 379/399.01 |
| 2006/0198430 A1 | 9/2006 | Rhee et al. | | |
| 2007/0121576 A1* | 5/2007 | Stein | ...................... | H04Q 11/04 370/351 |
| 2007/0124727 A1* | 5/2007 | Tennyson | .............. | H04L 5/1446 717/158 |
| 2007/0230667 A1* | 10/2007 | Warner | ................ | H04M 3/306 379/27.01 |
| 2008/0069136 A1* | 3/2008 | Keller-Tuberg | .... | H04L 12/2861 370/465 |
| 2008/0071516 A1* | 3/2008 | Cioffi | ....................... | H04B 3/32 703/21 |
| 2010/0114529 A1* | 5/2010 | May | ...................... | H04M 3/304 702/183 |
| 2010/0268823 A1* | 10/2010 | Torarp | ................... | H04W 24/02 709/225 |
| 2011/0051906 A1* | 3/2011 | Cioffi | ....................... | H04B 3/32 379/32.04 |
| 2011/0299550 A1* | 12/2011 | Karaoguz | .............. | G06Q 20/10 370/401 |
| 2013/0329729 A1* | 12/2013 | Mehta | ................... | H04L 12/185 370/390 |
| 2014/0153497 A1* | 6/2014 | Brisebois | .............. | H04W 28/18 370/329 |

OTHER PUBLICATIONS

Anonymous: "Speedtest.net by Ookla—the Global Broadband Speed Test", Sep. 27, 2013, XP055122436, Retrieved from the Internet on 201-06-10: URL: https://web.archive.org/web/20130927033818/http://www.speedtest.net/.

* cited by examiner

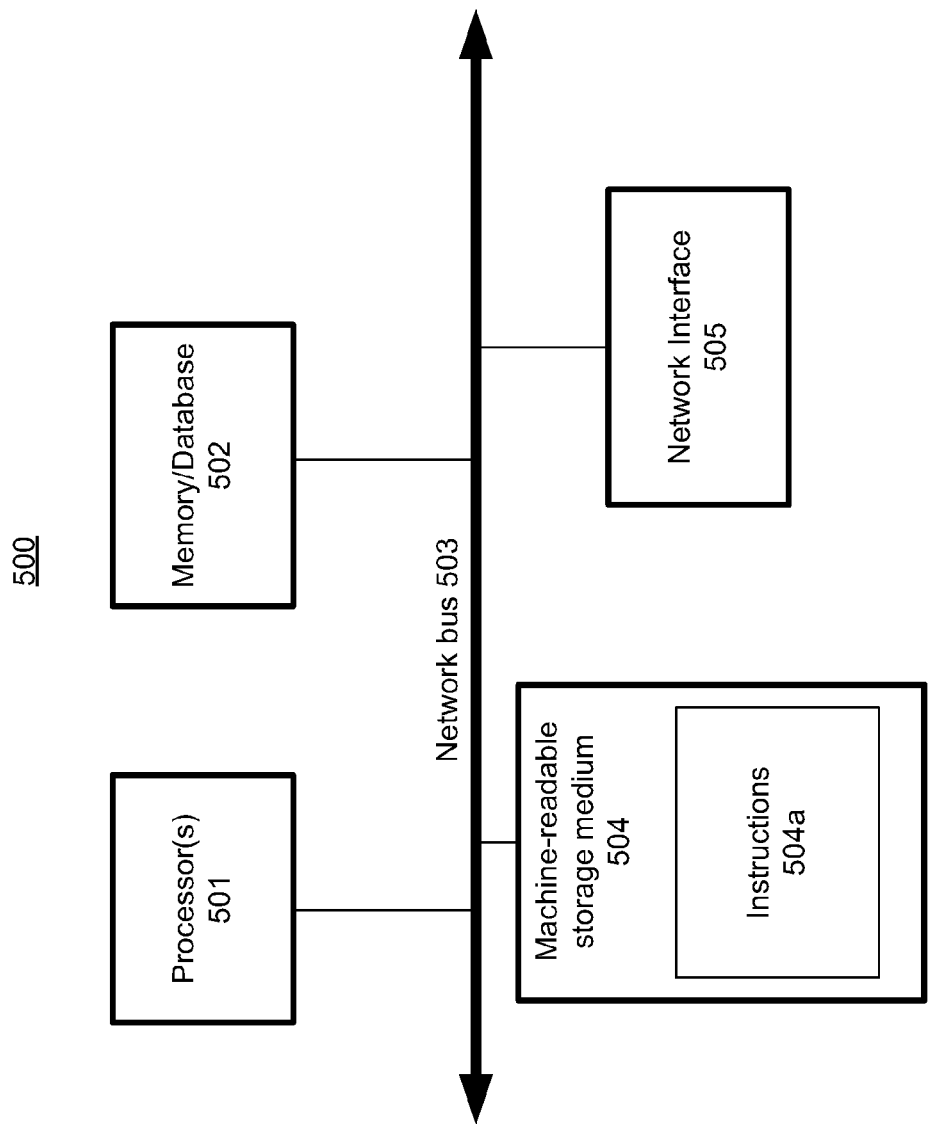

SYSTEM AND METHOD FOR VALIDATING BROADBAND SERVICE RECOMMENDATION

CLAIM FOR PRIORITY

This application claims priority to PCT Patent Application Serial No. PCT/US13/62691, filed on 30 Sep. 2013, titled "SYSTEM AND METHOD FOR VALIDATING BROADBAND SERVICE RECOMMENDATION," and which is incorporated by reference in entirety.

BACKGROUND

In current practice, Wide Area Network (WAN) and/or Local Area Network (LAN) performance information is not centrally analyzed by a communication device coupled to such networks to account for information such as topological information, geographical information, user's network usage pattern, quality of network connection, time, throughput, user behavior, usage data, etc. Accordingly, user behavior associated with user's broadband service may not be contextually analyzed by any central system to provide service recommendation to the user of the broadband service according to its broadband service usage. Furthermore, a lack of validated service recommendation may result negatively in terms of customer (user) satisfaction of the broadband service.

Lack of validated service recommendation may also result in the communication devices (e.g., a smart phone, computer, a router, Digital Subscriber Line, etc.) to adapt a service that may not be compatible with the communication device and/or service plan. Typically, operators rely on basic information such as loop lengths to determine the service products of customers, which often leads to incorrect service upgrades or downgrades. Such process is inefficient in terms of resources and costs as customers are more likely to call and complain, and call center/technicians should handle their complaints by manually adjusting services, or physically fixing the broadband service hardware (e.g., Digital Subscriber Line (DSL) lines).

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 5 is a processor-based system having machine-readable storage medium with computer executable instructions to validate service recommendations, according to one embodiment of the disclosure.

DETAILED DESCRIPTION

Figure 1:
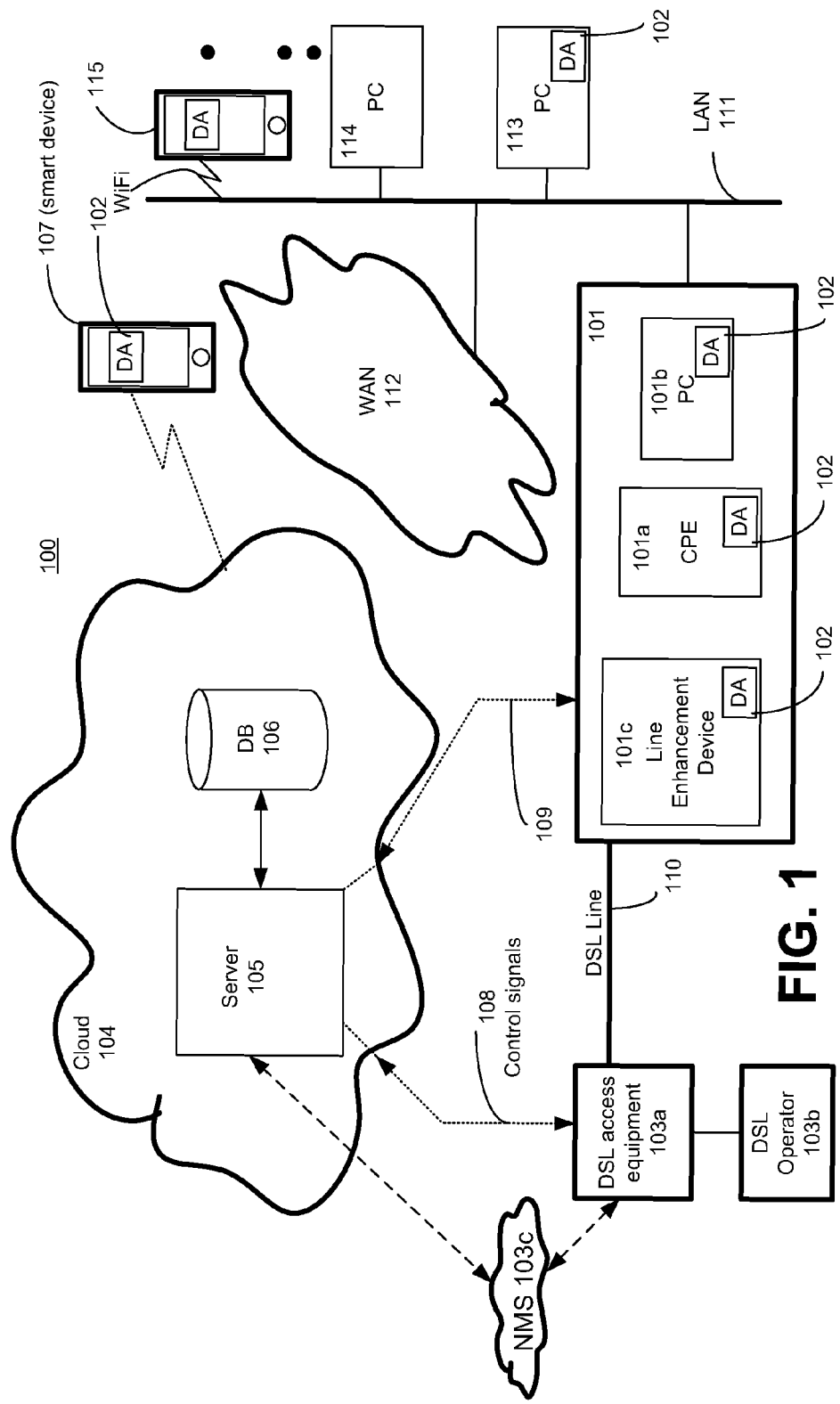
FIG. 1 is a communication network with some or all communication devices having a downloadable agent and/or machine executable instructions to validate broadband services for recommendation, according to one embodiment of the disclosure.

The embodiments relate to a system and method for qualifying a broadband service (e.g., Digital Subscriber Line (DSL) loop) and validating services. The embodiments describe a Service Recommender (SR) that recommends service upgrade or downgrade using current and historical broadband service conditions. SRs use various state-of-the-art estimation algorithms, but may suffer from recommending false positives and negatives due to estimation errors and time variations.

In one embodiment, when service providers use SRs, they may identify customers for upgrades, and call them for up-sell (i.e., upgrade broadband service from the current service deal), or identify customers for downgrades if it identifies an over-sell (e.g., curtail some of the features of the broadband service to improve overall experience of the broadband service by a user). Once agreement is reached between users of the broadband service and its provider(s), service providers may actually change service products and profiles of the broadband service for the user. After service and profile changes, if the broadband service does not meet the service requirement, service providers may change services, or dispatch technicians to fix the broadband service. In one embodiment, to reduce impacts of false positives of service recommendations (which may be quite costly), the embodiments of SRs validate its recommendations by trying out the new services temporarily and evaluating the performance of the broadband service in a fully automatic manner.

In one embodiment, SR process comprises the process of data collection, evaluation of broadband service based on the collected data, and validation of broadband service recommendations including upgrades and downgrades to the broadband service before presenting the broadband service recommendations to the user of the broadband service.

The term "performance" generally refers to network throughput (e.g., TCP/UDP), latency, jitter, connectivity, error rates, power consumption, transmit power, etc. Improving performance of the communication system includes increasing throughput, reducing error rate and latency, improving (i.e., reducing) jitter, reducing power consumption, etc. for the communicating system.

In one embodiment, SR validation process comprises checking eligibility of broadband service (e.g., of DSL lines) for SR validation. In one embodiment, broadband service product currently in use by the user is updated temporarily (e.g., for a few hours or a day). In one embodiment, profile optimization process is performed on the updated broadband service. In such an embodiment, a default profile for the DSL line is provided after a service product change may not work or may not stabilize the DSL line at issue.

DSL profiles are complex and include many factors that constantly interact, such as power levels and margins, bit rates, interleaving, and forward error correction schemes. Operators have traditionally defined a limited number of profiles for their network and applied them to their DSLs manually using simple heuristics such as loop length. Each loop in the network is different, however, and often the result of the traditional process is that lines are either under-provisioned by being programmed to a speed lower than what they can support, or over-provisioned by being programmed to a speed that is too high to maintain stability. Under-provisioned lines lead to lost revenue opportunities for higher-speed services or for applications such as IPTV.

Over-provisioned lines lead to higher maintenance costs from customer complaints and high churn rates.

Based on the DSL operator's service tiers and quality-of-service targets, in one embodiment, the profile optimization automatically configures all lines in the network to the highest possible stable speed. In one embodiment, the profile optimization is run proactively on all lines in an operator's network periodically, often on a daily basis. In one embodiment, the profile optimization can also be run reactively in the case of newly provisioned lines, or at the request of technical or customer support personnel.

For example, DSL lines which are now operating on the updated broadband service product are evaluated to determine their performance with the updated product. In one embodiment, data is collected and results from profile optimization process are evaluated and different service products are tried for the user to determine an optimum performing broadband service product under the circumstances (e.g., location, physical line limits, maximum throughput, etc). In one embodiment, after evaluation of the collected data, original broadband service product settings are restored for the user, and the user is provided with a recommendation about improving its current broadband service. One technical effect of the embodiments is that the user is provided with a validated broadband service recommendation. Accordingly, offers of services which are not sustainable are avoided.

The term "TCP" stands for Transmission Control Protocol. The term "UDP" refers to User Datagram Protocol. The term "successful" generally refers to an indication suggesting safe receipt of a packet that is often confirmed by ACK (acknowledge) message packet. In another embodiment, operational data such as error counts, retransmission counts, modulation, signal strength, etc. are used to estimate the performance and throughput of the communications link.

The term "Local Area Network" (LAN) generally refers to a computer or communication network that interconnects computers or communication devices in a limited area such as a home, school, computer laboratory, or office building using network media.

The term "Wide Area Network" (WAN) generally refers to a telecommunication network that covers a broad area (i.e., any network that links across metropolitan, regional, or national boundaries) compared to the limited area covered be a LAN.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" generally refers to two or more elements which are in direct contact (physically, electrically, magnetically, electromagnetically, optically, etc.). The term "coupled" generally may also refer to two or more elements that are not in direct contact with each other, but still cooperate or interact with each other.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 is a communication network 100 with some or all communication devices having a downloadable agent (DA) and/or machine executable instructions to validate broadband services for recommendation, according to one embodiment of the disclosure.

In one embodiment, communication network 100 comprises a local network 101 (e.g., a network at home) having Customer Premises Equipment (CPE) 101a and a personal computer (PC) 101b. In one embodiment, LAN 101 optionally comprises a line enhancement device 101c which is any device coupled to DSL 110 that improves the quality or performance on DSL 110. In one embodiment, line enhancement device 101c is a standalone device. In another embodiment, line enhancement device 101c is integrated with CPE 101a. In one embodiment, one or more devices of LAN (e.g., home LAN) 101 are operable to communicate with server 105 via Internet 109 (via wired or wireless connections).

In one embodiment, communication network 100 comprises a server 105 coupled to a database 106. In one embodiment, server 105 and/or the database 106 reside in a cloud 104.

The term "cloud" refers generally to cloud computing which is the delivery of computing and storage capacity as a service to a community of end-recipients. The term "cloud" is indicated with use of a cloud-shaped symbol 104 as an abstraction for the complex infrastructure it contains in system diagrams. Cloud computing entrusts services with a user's data, software and computation over a network. In one embodiment, server 105 resides in cloud 104 and is operable to perform complex analysis (e.g., statistical) based on information collected from other communication devices via the Internet.

In one embodiment, communication network 100 comprises DSL access equipment 103a (also called a DSL access network, or DSL node) which is operable to communicate with CPE 101a via DSL line 110. In one embodiment, DSL access equipment 103a comprises a DSLAM (digital subscriber line access multiplexer). In one embodiment, DSL access equipment 103a comprises a CO (central office). In one embodiment, DSL access equipment 103a receives control signals 108 from server 105 that instruct a DSL operator 103b about ways to improve performance of its customers e.g., CPE 101a, etc.

In one embodiment, control signals 108 include at least one or more of signals or commands related to: power, (e.g., transmit power); spectrum control, (e.g., Power Spectral Density (PSD) mask, margin, data rate, latency/delay); coding, (e.g., Forward Error Correction (FEC) coding).

In one embodiment, cloud 104 communicates with DSL access equipment 103a via Network Management System (NMS) 103c. The NMS 103c may represents any management system used by the DSL network operators or DSL service providers to manage the DSL lines and their network. In one embodiment, operational data can be collected from NMS 103c of the service provider. In one embodiment, NMS 103c is communicatively coupled to DSL modem pairs. In one embodiment, operational and performance data is collected from NMS 103c. In one embodiment, a DSL line can be controlled by NMS 103c. In one embodiment, control signals 108 are received by NMS 103c.

In one embodiment, server 105 is operable to access external communication devices (external to cloud 104) through cloud-based applications via a web browser or mobile application. In the embodiments, DA 102 is operable to communicate with resources (e.g., server 105, database 106) of cloud 104. In one embodiment, DA 102 may be downloaded from any platform e.g., a disk, memory stick, web browser, web server, etc. In one embodiment, DA 102 associated with a communication device executes on an Internet browser (e.g., Safari®, Netscape®, FireFox®, Internet Explorer®, etc.). In one embodiment, DA 102 associated with the communication device is accessible remotely via the Internet.

In one embodiment, DA 102 is operable to execute on multiple computing platforms with different operating systems. For example, DA 102 may operate on operating systems including Android, Berkley Software Distribution (BSD), iOS, GNU/Linux, Apple Mac OS X, Microsoft Windows, Windows Phone, and IBM z/OS. In one embodiment, DA 102 is operable to execute in a virtual machine (VM). A VM is a software implementation of a machine (e.g., a computer) that executes programs like a physical machine. Examples of virtual machines include a Java Virtual Machine and the previously mentioned operating systems executing in VMWare, Virtual Box or the like. In one embodiment, DA 102 may receive automatic updates to keep the application up to date with the latest features. In one embodiment, the downloadable agent is dynamically downloaded to the computing device.

The term "dynamically" generally refers to automatic action. The term "dynamically" also refers to downloading of an agent by a computing device on-demand and prior to use of an agent. A dynamically downloaded agent may be deleted from the computing device following the use of that agent. The term "dynamically" may also refer to automatic (i.e., with little or no human interaction) adjusting of service profile of a broadband subscriber with a new service profile.

In one embodiment, communication network 100 comprises a wireless device, for example, a smart device 107 (e.g., smart phone, tablet, etc.) with a DA 102. In one embodiment, DA 102 is operable to review an analysis report generated by server 105 for any of the communicating devices it has authorization to access.

In one embodiment, server 105 is operable to receive WAN performance information from a DA 102. In one embodiment, DA 102 is executable on a computing device (e.g., 101a-b, 107, 113) coupled to LAN 111 of a broadband subscriber. In one embodiment, LAN 111 is coupled by another device to WAN 112. In one embodiment, a DSL modem and a home gateway couple LAN 111 to WAN 112. In one embodiment, the DSL modem and home gateway are integrated into a single enclosure.

In one embodiment, DA 102 associated with the communication device collects data locally within the communication device and then periodically sends the collected data to server 105. In one embodiment, DA 102 may wait for certain conditions or thresholds to be met before sending all collected data to server 105.

In one embodiment, conditions and/or thresholds are related to a function of the type of data collected. For example, collected data may include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, conditions are limits or thresholds on a performance level related to collected data. In one embodiment, a condition is an upper limit on jitter, or a lower limit on throughput. For example, if throughput drops below a lower limit/threshold, then DA 102 may report and send the data to server 105. In another example, if packet loss exceeds an upper limit, then DA 102 may report and send the data to the server. In one embodiment, a condition is time expiration on a scheduled collection. For example, DA 102 may send data to server 105 after a pre-defined time is expired.

In another embodiment, server 105 collects information from the DA's, through server initiated communication. In one embodiment, server 105 collects information by polling on scheduled basis. One such example of polling is ping. In one embodiment, server 105 may send a signal to a DA 102, or ping a DA 102, or communicate with a DA 102 on scheduled basis, after which DA 102 sends collected information to server 105.

In one embodiment, the computing device is one of: computer, personal computer, laptop/desktop, smart phone, tablet computing device; an access point (AP); a base station; a wireless smart phone device; a wireless LAN device; an access gateway; a router, a performance enhancement device; a DSL CPE modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, server 105 is operable to store the WAN performance information in database 106 associated with server 105. In one embodiment, server 105 is operable to store the WAN performance information with an associated timestamp. In one embodiment, DA 102 is operable to collect LAN performance data from at least one of the computing device (e.g., 101b) and another device (e.g., PC 113) coupled to LAN 111. In one embodiment, server 105 is operable to receive the LAN performance data from DA 102.

In one embodiment, the WAN and LAN performance information include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

Topological information may include information regarding the WAN or LAN topology. For example, whether a DSL modem is behind a firewall, or whether the Internet gateway is connected to a Wi-Fi access point via a router. The geographical information may include the address or global positioning system (GPS) location of the WAN or LAN modem, or the Internet gateway. The geographical information may be useful for example, for neighborhood analysis, and for correlating information regarding neighbors, or users in a given geographical location. Environment Statistics may include any statistics related to the environment surrounding the WAN or LAN. For example, usage statistics, statistics on periods of peak operation, statistics on the data traffic (peak traffic, average traffic, etc.).

In one embodiment, LAN performance information also includes, without limitation: LAN media type, such as Ethernet, Wi-Fi, or power-line adapters; LAN media throughput rates; channel assignments for Wi-Fi media; Wi-Fi mode such as 802.11g or 802.11n; Wi-Fi transmit power levels; and spectral masks for power-line communication.

In one embodiment, server 105 is operable to analyze the WAN performance information to generate an analysis result. In one embodiment, server 105 is operable to generate analysis result by computing throughput of DSL connection 110 by collecting current performance metrics associated with DSL service. In one embodiment, server 105 is operable to perform statistical analysis, including throughput, based on information received from the DA 102 and other information in the database.

In one embodiment, server 105 is operable to compute throughput of a communication link (e.g., Wi-Fi or Ethernet link 109) by probing. In one embodiment, the process of probing comprises: transmitting probing data from a communication device (e.g., PC 101b) to another communication device (e.g., PC 113, PC 114, etc.); and waiting for a predetermined time before reading operational data including counter values related to user data traffic. In one embodiment, the counter values include at least one of packet error counts, packet retransmission counts, successful ACK message counts, etc. The throughput information discussed in this embodiment and other embodiments of this disclosure could include at least one or more of the following: instantaneous speed or data rate, average data rate, and/or information on the peak and minimum data rates of a connection or communication link associated with the LAN and/or with the associated WAN.

The term "probing" generally refers to testing of a communication network by sending test pattern/data over the network from one communication device to another communication device, and then measuring the response from the sent test pattern.

The term "operational data" generally refers to user visible or accessible data and is generally used for debugging and basic performance monitoring of communication systems.

In one embodiment, the method of probing comprises: transmitting probing data from a communication device (e.g., PC 101b) to another communication device (e.g., PC 113); and receiving a report indicating amount of data or data received by the other communication device.

In one embodiment, server 105 is operable to determine availability of higher bandwidth for operating a DSL service. In one embodiment, server 105 is operable to determine purchase information (or service product information) for improving DSL service performance. In one embodiment, server 105 is operable to determine network, service, or communication link utilization information for optimizing a consumer DSL service cost. In one embodiment, server 105 is operable to group data in database 106 according to at least one of geographical location, services type, service provider, or time. The service product information includes information regarding the type and specification of the DSL service or services which is a DSL service user/customer has purchased from the DSL service provider.

In one embodiment, server 105 receives information from other devices and/or sources other than the communication devices to perform a comprehensive analysis of the performance of the communication system as a whole and/or individually for the communication devices in the communication system. Examples of the other devices and/or sources include near-by radio stations, location of AM radio stations, goals or business rules defined by an operator, weather forecast from the National Weather Service, etc.

In one embodiment, server 105 is operable to validate the analysis (or evaluated) i.e., service recommendations are validated. In one embodiment, server 105 is operable to offer availability of higher bandwidth for operating a DSL service to DA 102 of 101a. In one embodiment, server 105 is operable to report the analysis result by sending purchase information (or service product information) to PC 101b, smart device 107, or the user for improving DSL service performance. In one embodiment, server 105 is operable to report the analysis result by sending utilization information to PC 101b, smart device 107, or any device accessible by the user for optimizing consumer DSL service cost.

In one embodiment, DA 102 receives updated or new operational parameters from server 105 based on the evaluation performed by server 105. For example, server 105 when evaluating the data collected by DA 102 of 101a, also takes into account historical information about the communication device 101a and information from other communication devices coupled to the network to determine updated operational parameters for verification.

In one embodiment, server 105 is operable to report the validated service recommendation to at least one of the broadband subscriber and the broadband subscriber's service provider. In one embodiment, server 105 is operable to receive an on-demand change request. In one embodiment, the on-demand change is associated with at least one of: throughput, latency, packet loss, or jitter. For example, DA 102 of the PC 101b sends a request via connection 109 to server 105 to acquire higher throughput than current throughput for its DSL line 110. In such an embodiment, server 105 performs analysis based on available data in database 106 and determines if the on-demand change request by PC 101b can be met. In one embodiment, server 105 validates the on-demand change request before concluding that the on-demand change request can be met.

In one embodiment, server 105 performs comprehensive analysis to recommend a service profile to a broadband subscriber and the broadband subscriber's service provider. In one embodiment, server 105 receives broadband data from an agent (e.g., 102 of 115). In one embodiment, the agent is executable on a computing device (e.g., 115) coupled to LAN 111 of a broadband subscriber.

In one embodiment, broadband data is user data and at least one of WAN performance information or LAN performance data. In one embodiment, a current service profile of the broadband subscriber is identified. In one embodiment, the received broadband data in view of a current service profile is analyzed by server 105. In one embodiment, a new service profile is determined by server 105 for the broadband subscriber according to the analyzed broadband data. In one embodiment, the new service profile is installed temporarily for the broadband subscriber and the new service profile is then validated.

In one embodiment, cloud 104, server 105, or broadband subscriber's service provider dynamically adjusts current service profile of the broadband subscriber with the new service profile and then validates the new service profile. In one embodiment, cloud 104 collects data associated with the new broadband service profile. In one embodiment, cloud 104 evaluates the collected data for validating the service recommendation, the service recommendations including upgrades and downgrades to the broadband service. In one embodiment, cloud 104 validates broadband service recommendations, in response to evaluating the collected data, before formally presenting the broadband service recommendations to user of the broadband service.

Figure 2A:
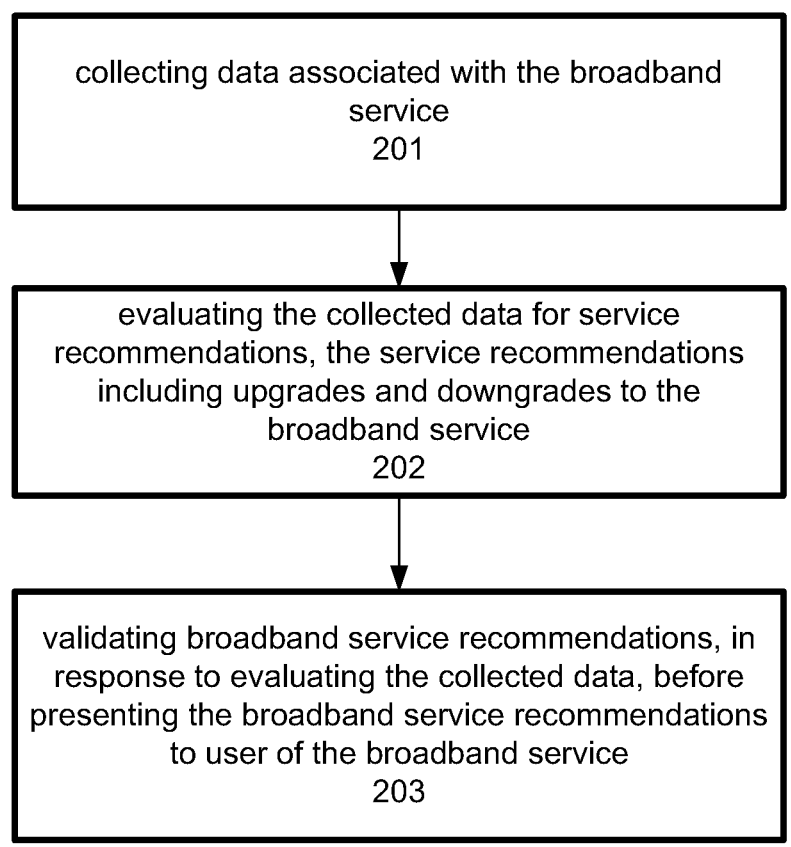
FIG. 2A is a high level method for service recommendation including validating service recommendations, according to one embodiment of the disclosure.

FIG. 2A is a high level method 200 for service recommendation including validating service recommendations, according to one embodiment of the disclosure. It is pointed out that those elements of FIG. 2A having the same reference numbers (or names) as the elements of any other figure can operate or function in any manner similar to that described, but are not limited to such.

Although the blocks in the flowcharts with reference to FIG. 2A are shown in a particular order, the order of the actions can be modified. Thus, the illustrated embodiments can be performed in a different order, and some actions/blocks may be performed in parallel. Some of the blocks and/or operations listed in FIG. 2A are optional in accordance with certain embodiments. The numbering of the blocks presented is for the sake of clarity and is not intended to prescribe an order of operations in which the various blocks must occur. Additionally, operations from the various flows may be utilized in a variety of combinations. In one embodiment, the following process may be performed by cloud 104. In other embodiments, other computing devices may perform the described methods.

At block 201, data is collected associated with a broadband service. In one embodiment, broadband service is a DSL broadband service. In one embodiment, the process of collecting data associated with the broadband service includes collecting DSL or Wi-Fi data by network monitoring or management tools. In one embodiment, cloud server 105 collects DSL or Wi-Fi data through NMS 103c or by DA 102. In one embodiment, if Wi-Fi is not a separate broadband service subscribed by the user because another communication medium (e.g., cable router, DSL router, etc.) is coupled to the Wi-Fi network, data collected from Wi-Fi can be used to predict appropriate services (i.e., predict service recommendations).

In one embodiment, the process of collecting data associated with the broadband service includes collecting back-haul capacity data associated with the broadband service. In one embodiment, back-haul capacity of DSL networks may be provided by operators, or may be collected at the DSLAM level. In one embodiment, if a network has a limited back-haul capacity, service upgrades are recommended for lines with higher needs of higher bandwidth, and service downgrades are recommended for lines with less need of higher bandwidth.

In one embodiment, collecting the data associated with the broadband service is initiated by the user via a web-based tool, for example, CloudCheck. In one embodiment, collecting the data includes collecting user preference data or usage data associated with the broadband service. In one embodiment, usage data includes at least one of: location of the user; location of the broadband service associated with the user; Layer 3 data; or amount of data packets transmitted and received by the user over a broadband link associated with the broadband service. In one embodiment, user preference data includes at least one of: throughput for a broadband link associated with the broadband service; stability of line associated with the broadband service; or delay of the line.

In one embodiment, collected data includes DSL operational data; historical performance counter data, throughput data, SELT (single ended loop testing) data; Wi-Fi performance data; data collected when the user is shopping online using the broadband service; data collected when the user is browsing the Internet using the broadband service; data collected when the user is accessing video online using the broadband service; data collected when the user is participating in online gaming activities using the broadband service; data collected when the user is accessing cloud-based applications using the broadband service; data collected when the user is participating in a two-way communication using the broadband service; neighborhood configuration data; or data associated with services and recommendations of neighboring customers.

At block 202, collected data is evaluated for service recommendations, where service recommendations include upgrades and downgrades to the broadband service. In one embodiment, evaluating the collected data comprises analyzing the collected data to determine whether a broadband line associated with the broadband service can be upgraded to a higher level of service. Examples of higher level of services include higher downstream or upstream rates or both, lower latency (i.e., delay), better error corrections, etc.

In one embodiment, evaluating the collected data comprises identifying whether the broadband service is capable of being upgraded or has to be downgraded. For example, a broadband service whose performance can be improved because it is being under utilized is capable of being upgraded. Conversely, a broadband service which is not operating as the service product claims it should, for example, the broadband service cannot achieve its advertised performance level because of physical limitations, then it is capable of being downgraded.

In one embodiment, identifying whether the broadband service is capable of being upgraded is performed when it is determined that validation records associated with a physical layer indicate that the physical layer achieves required data transfer rates. In one embodiment, identifying whether the broadband service is capable of being upgraded is performed when a line associated with the broadband service is expected to be in stable status (e.g., the status indicates low errors via CV counts, or less (or non-frequency) re-initializations via REINIT counts).

In one embodiment, identifying whether the broadband service is capable of being upgraded is performed when it is determined that back-haul capacity is not a limiting factor for service upgrades. In one embodiment, if back-haul capacity is a limiting factor, lines associated with the broadband service can be prioritized according to factors including users' usage pattern of its broadband service.

In one embodiment, identifying whether the broadband service is capable of being upgraded is performed if similar lines associated with the broadband service in a geographical area (e.g., neighborhood) meet the requirements of the current broadband service, and are also operating stably. In one embodiment, identifying whether the broadband service is capable of being upgraded is performed if the current service product for the broadband service cannot support users' requirements of bandwidth use, but the broadband service is capable of supporting the users' requirements if an upgraded service product is used. One way to infer users' requirements of bandwidth use is to monitor amount of user traffic through extra data collection. For example, if users use most of their allotted bandwidth, it infers that the current service product is not enough to support users' requirement for bandwidth use. In one embodiment, identifying whether the broadband service is capable of being upgraded is performed when the user cannot use the broadband service in a stable manner. In such an embodiment, a downgrade of service product is recommended.

In one embodiment, evaluating the collected data comprises: assigning a score according to at least one of: determination that a physical layer of the broadband service is stable; determination that a broadband line is stable using a different service product; determination that validation records associated with the physical layer indicate that the physical layer achieves target data transfer rates; and determination that back-haul capacity is not a limiting factor for service upgrades. In one embodiment, evaluating the collected data comprises comparing the score to a threshold.

In one embodiment, score is computed for each target service product. For example, if a line is 3M service, and considered target service products are 10M and 7M, the process will compute scores for both 10M and 7M services. In one embodiment, scores are determined by summing up individual scores.

For example, for 10M service, if the 10M service is expected to be stable then score increments by one. Continuing with the example, assume that the maximum downstream rate of the line is 8M. Because the 10M service does not meet its target rate 10M, then score remains unchanged (i.e., zero added to previous score). If back-haul capacity is large enough then previous score is incremented by one. 10M service is expected to improve the downstream rate by 5M, so previous score is updated by 0.5. In this example the total score the 10M services is 2.5. In another example, for 7M service, if the 7M service is expected to be stable then score increments by one. Continuing with this example, if the 7M service meets its target rate 7M then previous score is incremented by one. If back-haul capacity is large enough then previous score is incremented by one. If 7M service is expected to improve the downstream rate by 4M, then previous score is updated by 0.4. In this example, the total score the 7M service is 3.4. If the threshold is equal to 3, then the embodiments will choose 7M as the recommendation because its score is over the threshold, and the highest.

At block 203, broadband service recommendations are validated in response to evaluating the collected data. In one embodiment, the process of validating the broadband service recommendations is performed before presenting the broadband service recommendations to user of the broadband service. In one embodiment, validating the broadband service recommendations comprises prioritizing some broadband lines for validation relative to a score. The score may indicate the likelihood of successful upgrade or downgrade.

In one embodiment, the score is based on availability of capacity in back-haul. For example, if a DSLAM can afford more bandwidth than its current bandwidth i.e., DSL lines can be upgraded without downgrading other lines in the same DSLAM, then a score of +1 is assigned for the DSL lines in the DSLAM.

In one embodiment, the score is based on price of service. For example, a higher score is assigned for more expensive services. In one embodiment, the score is based on lines, associated with the broadband service, which lack validation record. For example, if there is no validation record then a score of zero is assigned. In one embodiment, the score is based on lines, associated with the broadband service, with recent changes in equipment of service. In one embodiment, score is not computed for a line which is being re-validated because of change in equipment. In one embodiment, the score is based on lines, associated with the broadband service, that are more likely to request upgraded service. For example, a user with higher broadband traffic because of streaming IPTV is more likely to request upgraded service. In one embodiment, the score is based on lines, associated with the broadband service, that are more likely to have higher up-sell potential. For example, if a user is currently using very low service product (e.g., 3M), but the achievable rate is high for that line (e.g., 20M) then a +1 score is assigned. In one embodiment, the score is based on lines, associated with the broadband service, with less accurate service recommendations due to higher estimation errors, or due to lack of data collections.

In one embodiment, validating the broadband service recommendations comprises updating a parameter set associated with the broadband service. In one embodiment, updating the parameter set is done temporarily. In one embodiment, not all lines are eligible for service recommendation validation. In one embodiment, validation of service recommendations is performed regularly. For example, every month validation of service recommendations is performed. In one embodiment, validation of service recommendations is performed after an event. For example, when equipment associated with the broadband service changes, then validation of service recommendations is performed.

In one embodiment, conditions are imposed to limit the scope of validating service recommendations. For example, validation of service recommendations may be limited to a predetermined number of lines, and/or minimum requirements for upgrades or downgrades (e.g., at least rate increase of more than 30%, etc. triggers a validating process).

Figure 2B:
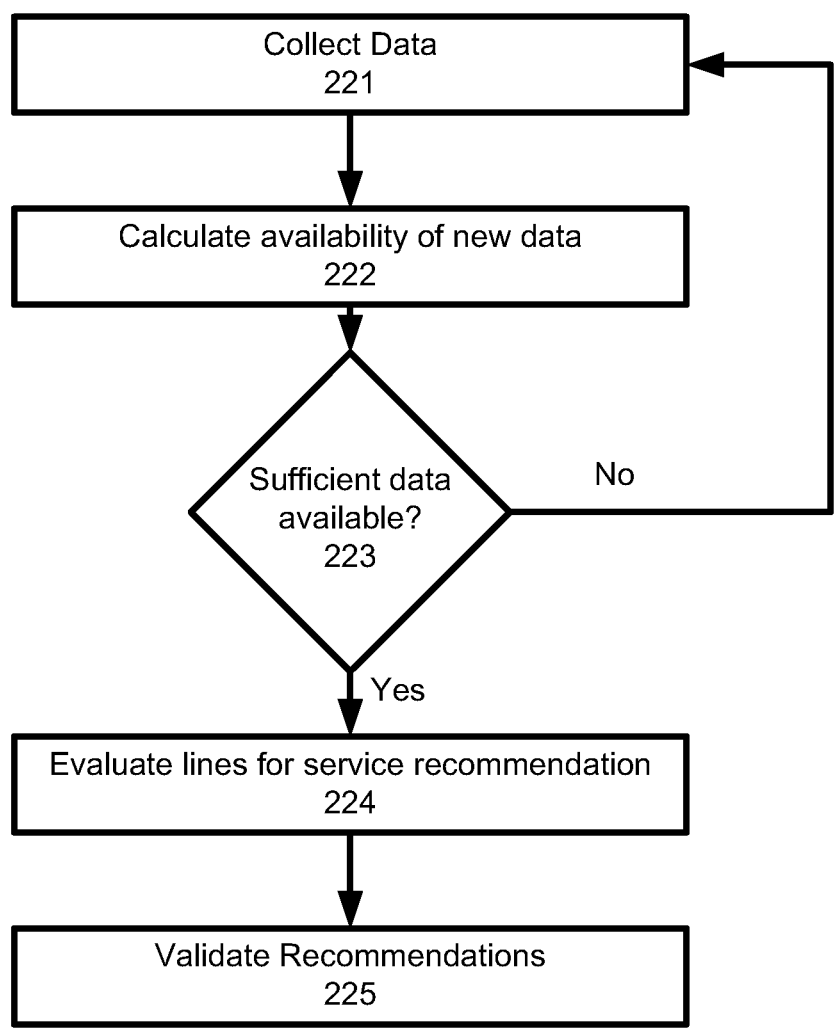
FIG. 2B is a high level method for service recommendation including validating service recommendations, according to another embodiment of the disclosure.

FIG. 2B is a high level method 220 for service recommendation including validating service recommendations, according to another embodiment of the disclosure. It is pointed out that those elements of FIG. 2B having the same reference numbers (or names) as the elements of any other figure can operate or function in any manner similar to that described, but are not limited to such.

Although the blocks in the flowcharts with reference to FIG. 2B are shown in a particular order, the order of the actions can be modified. Thus, the illustrated embodiments can be performed in a different order, and some actions/blocks may be performed in parallel. Some of the blocks and/or operations listed in FIG. 2B are optional in accordance with certain embodiments. The numbering of the blocks presented is for the sake of clarity and is not intended to prescribe an order of operations in which the various blocks must occur. Additionally, operations from the various flows may be utilized in a variety of combinations. In one embodiment, the following process may be performed by cloud 104. In other embodiments, other computing devices may perform the described methods.

At block 221, data associated with broadband service is collected. This step is similar to step 201 of FIG. 2A. At block 222, availability of new data is calculated. For example, cloud 104 determines availability of capacity in back-haul, price of other available service products that can be added to the existing service product, data about recent changes to equipment of service, availability of DSL performance/operational data, etc. At block 223, a determination is made about sufficiency of availability of new data. If collected data is not sufficient to make a determination about what types of upgrades or downgrades can be recommended to a user of the broadband service, the process proceeds back to block 221 and more data associated with the broadband service is collected.

If collected data is sufficient to make a determination about what types of upgrades or downgrades can be recommended to a user of the broadband service, then the process proceeds to block 224. At block 224, broadband line associated with the broadband service is evaluated for service recommendations. This process is similar to the process discussed with reference to block 202 of FIG. 2A. At block 225, service recommendations are validated as discussed with reference to block 203 of FIG. 2A.

Figure 3:
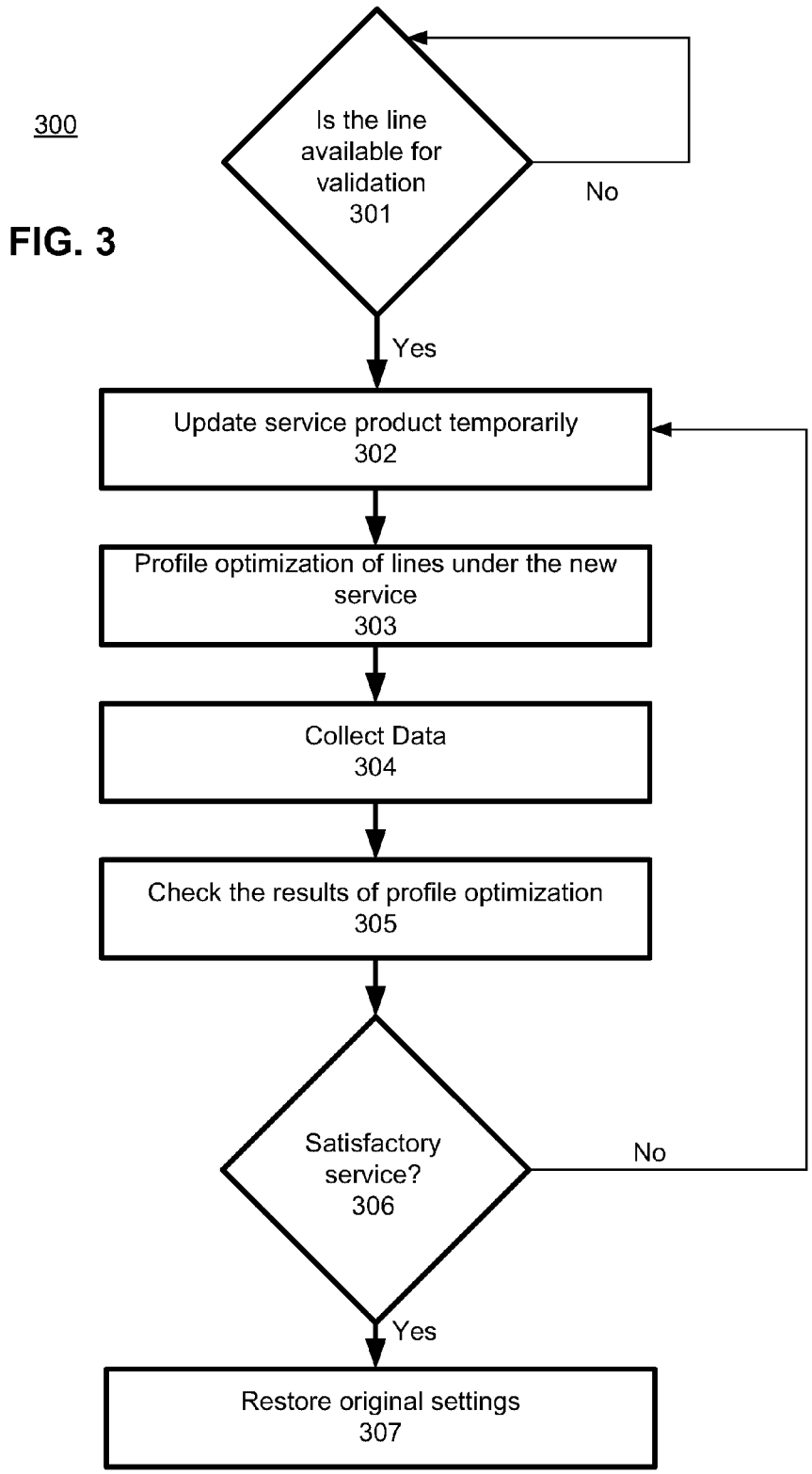
FIG. 3 is a method of validating service recommendations, according to one embodiment of the disclosure.

FIG. 3 is a method 300 of validating service recommendations, according to one embodiment of the disclosure. It is pointed out that those elements of FIG. 3 having the same reference numbers (or names) as the elements of any other figure can operate or function in any manner similar to that described, but are not limited to such.

Although the blocks in the flowcharts with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 are optional in accordance with certain embodiments. The numbering of the blocks presented is for the sake of clarity and is not intended to prescribe an order of operations in which the various blocks must occur. Additionally, operations from the various flows may be utilized in a variety of combinations. In one embodiment, the following process may be performed by cloud 104. In other embodiments, other computing devices may perform the described methods.

At block 301, determination is made whether the line associated with the broadband service is available for SR (service recommendation) validation. One reason for performing the process of block 301 is because not all the lines are eligible for SR validation. For example, some DSLAMs have a back-haul capacity issue that prevents the line from being upgraded to high rate services. For such DSLAMs SR validation may not be performed. If determination is made that the line is not available for SR validation, then process of block 301 is repeated after a predetermined programmable time (e.g., 1 month). In one embodiment, it may not be necessary to validate service recommendations too frequently unless there are significant changes in the lines, e.g. equipment changes, technician dispatches, etc. If determination is made that the line is available for SR validation, then process proceeds to block 302.

At block 302, the service product currently used by the user is updated temporarily with a new service product according to evaluated collected data (i.e., process performed by block 202 of FIG. 2A). For example, the service product is updated to have a better bandwidth for use in gaming or IPTV streaming because the collected data when evaluated indicated that the user engaged majority of the time in gaming or IPTV streaming processes.

At block 303, profile optimization of lines with new service product is performed. In one embodiment, one or more parameters are adjusted by the process of profile optimization. At block 304, data is collected with the new service product active. This data is used to verify whether the new service product which is activated temporarily achieves the results anticipated by the evaluating phase. For example, line with the new service product is monitored and configuration of the line is adjusted to fine optimal performance of the line, and also to determine whether the line can operate stably in the temporary service. In one embodiment, the line may be monitored for a predetermined duration which is sufficient to collect enough data to validate the temporary service. For example, the line with the new service product is monitored for certain number of days to increase the accuracy of validation before restoring the line to its original settings.

At block 305, results associated with the profile optimization are checked. The checking process determines whether new service product which is activated temporarily achieves the results anticipated by the evaluating phase. Once results are checked, at block 306, a determination is made whether the results are satisfactory. If it is determined that the results are not satisfactory, then the service product is updated again with another service product and the process of blocks 302 to 306 is repeated. If it is determined that the results are satisfactory, then the process proceeds to block 307. For example, if a line can operate stably while achieving the minimum required rate of the service, the service product is considered as satisfactory.

At block 307, original service product is restored for the user. In one embodiment, original setting including service product and line profile is restored for the line. The user is then presented with a broadband service recommendation which is based on the verified service recommendation. In one embodiment, the validation process is restarted when the validation record becomes obsolete. For example, when line conditions change (e.g., new equipment is introduced to operate the line), or the validation records become old (e.g., older than one year), then validation process 300 is restarted. In one embodiment, validation process 300 is performed when the user is not using the line or the users' usage of the line is minimal. For example, data collected overtime provides patterns of user usage behavior and so validation process 300 is initiated when user is least likely to notice the process (e.g., in the middle of night).

Figure 4:
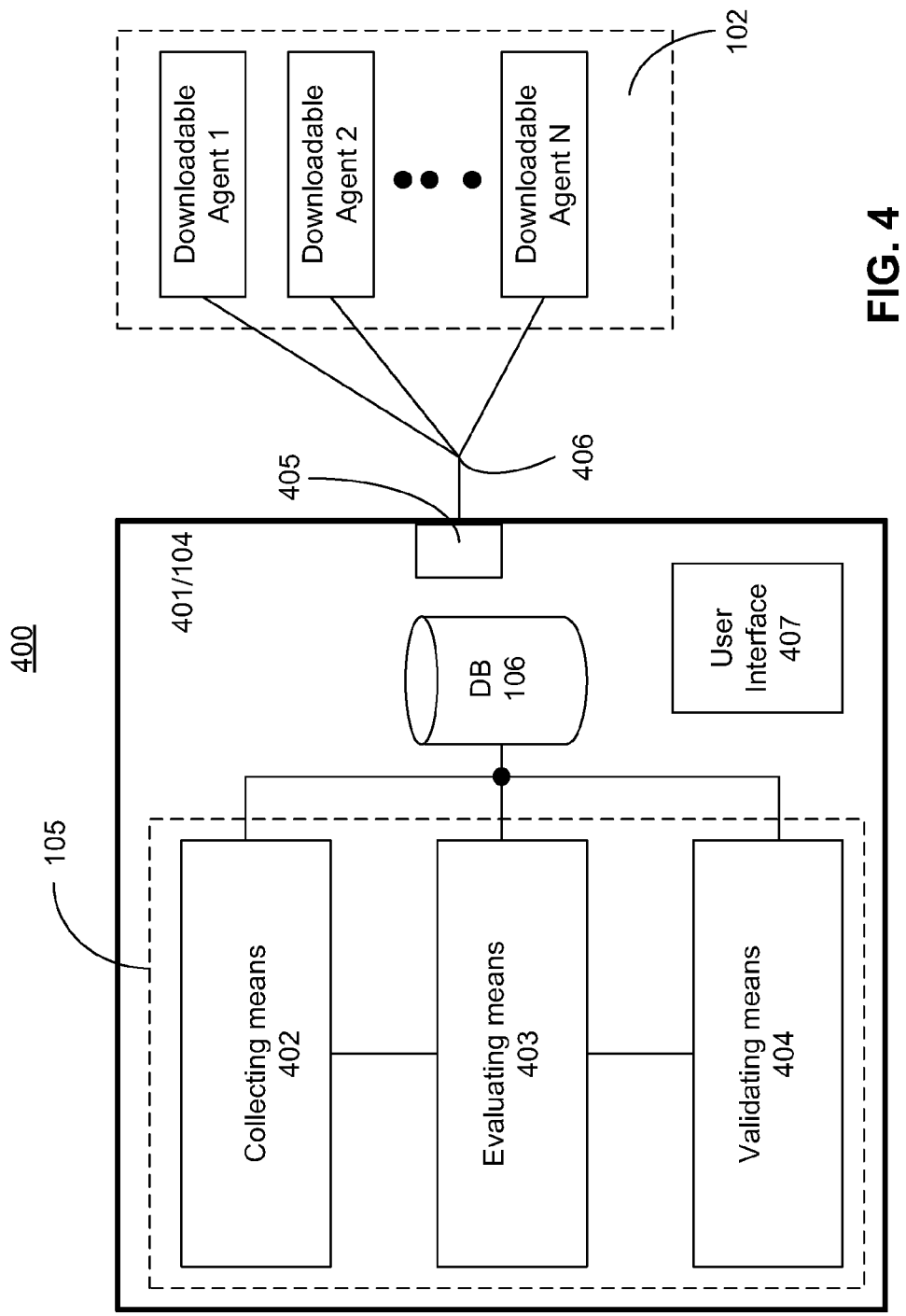
FIG. 4 is a system for validating service recommendations, according to one embodiment of the disclosure.

FIG. 4 is a system 400 for validating service recommendations, according to one embodiment of the disclosure. It is pointed out that those elements of FIG. 4 having the same reference numbers (or names) as the elements of any other figure can operate or function in any manner similar to that described, but are not limited to such.

In one embodiment, system 400 comprises a device 401 (e.g., cloud 104) having the server (e.g., 105) coupled to the database (e.g., 106). In one embodiment, server 105 comprises: a first module 402 (also called collecting means) for collecting broadband data from an agent (e.g., agent 102). In one embodiment, the agent is executable on a computing device coupled to a LAN of a broadband subscriber. In one embodiment, broadband data is user usage data and at least one of WAN performance information or LAN performance data. In one embodiment, agent 102 (i.e., downloadable agent) includes an Application Programming Interface (API). In one embodiment, first module 402 performs the process described with reference to block 201 of FIG. 2A.

Referring back to FIG. 4, in one embodiment, server 105 comprises a second module 403 (also called evaluating means) which identifies a current service profile of the broadband subscriber and evaluates the received broadband data in view of the current service profile. In one embodiment, second module 403 determines a new service profile for the broadband subscriber according to the analyzed broadband data. In one embodiment, second module 403 performs the process described with reference to block 202 of FIG. 2A, and blocks 222, 223, and 224 of FIG. 2B.

Referring back to FIG. 4, in one embodiment, server 105 comprises a third module 404 (also called validating means) which validates service recommendations prior to recommending a new service product to the broadband subscriber and/or the broadband subscriber's service provider. In one embodiment, third module 404 performs the process described with reference to block 203 of FIG. 2A, and blocks 301-307 of FIG. 3.

Referring back to FIG. 4, in one embodiment, server 105 comprises: a management interface 405 for communicating with the DA 102 (any one of DAs 1-N, where 'N' is a positive integer) via the Internet 406 (e.g., 111, 109 of FIG. 1). In one embodiment, server 105 comprises: a user interface module 407 for providing access to other communication devices and for displaying information associated with the first 402, second 403 and third 404 modules.

FIG. 5 is a processor-based system 500 having machine-readable storage medium with computer executable instructions to validate service recommendations, according to one embodiment of the disclosure. It is pointed out that those elements of FIG. 5 having the same reference numbers (or names) as the elements of any other figure can operate or function in any manner similar to that described, but are not limited to such.

In one embodiment, processor-based system 500 comprises a processor(s) 501, memory/database 502, network bus 503, machine-readable storage medium 504, and network interface 505.

In one embodiment, machine-readable storage medium 504 and associated computer executable instructions 504a may be in any of the communication devices and/or servers discussed herein. The computer-machine-readable/executable instructions 504a are executed by processor 501. Elements of embodiments are provided as machine-readable medium for storing the computer-executable instructions (e.g., instructions to implement the flowcharts and other processes discussed in the description).

In one embodiment, database 502 is operable to store data used by the instructions 504a (also called software code/instructions). In one embodiment, network interface 505 is operable to communicate with other devices. In one embodiment, the components of processor-based system 500 communicate with one another via network bus 503.

The machine-readable storage medium 504 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions 504a executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software." The program software code/instructions 504a typically include one or more instructions stored at various times in various tangible memory and storage devices in or peripheral to the computing device, that, when fetched/read and executed by the computing device, as defined herein, cause the computing device to perform functions, functionalities and operations necessary to perform a method, so as to execute elements involving various aspects of the function, functionalities, and operations of the method(s) forming an aspect of the disclosed subject matter.

For the purposes of this disclosure a module is a software, hardware, or firmware (or combinations thereof) system, process or functionality, or component thereof, that performs or facilitates the processes, features, and/or functions, functionalities and/or operations described herein (with or without human interaction or augmentation) as being performed by the identified module. A module can include sub-modules. Software components of a module may be stored on a tangible machine readable medium (e.g., 504). Modules may be integral to one or more servers, or be loaded and executed by one or more servers. One or more modules may be grouped into an engine or an application.

A tangible machine readable medium (e.g., 504) can be used to store program software code/instructions (e.g., 504a) and data that, when executed by a computing device 500, cause the computing device 500 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system 500 is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment, a method for validating a broadband service for recommendation is provided. The method comprises: collecting data associated with the broadband service; evaluating the collected data for service recommendations, the service recommendations including upgrades and downgrades to the broadband service; and validating broadband service recommendations, in response to evaluating the collected data, before presenting the broadband service recommendations to user of the broadband service.

In one embodiment, the broadband service is a DSL broadband service. In one embodiment, collecting the data associated with the broadband service includes collecting by network monitoring tools DSL or Wi-Fi data. In one embodiment, the DSL or Wi-Fi data includes at least one of: historical performance data; Digital Subscriber Line (DSL) operational data; SELT data; throughput data; Wi-Fi performance data; data collected when the user is shopping online using the broadband service; data collected when the user is browsing the Internet using the broadband service; data collected when the user is accessing video online using the broadband service; data collected when the user is participating in online gaming activities using the broadband service; data collected when the user is accessing cloud-based applications using the broadband service; data collected when the user is participating in a two-way communication using the broadband service; neighborhood configuration data; or data associated with services and recommendations of neighboring customers.

In one embodiment, collecting the data associated with the broadband service includes collecting back-haul capacity data associated with the broadband service. In one embodiment, collecting the data associated with the broadband service is initiated by the user via a web-based tool. In one embodiment, collecting the data includes collecting user preference data or usage data associated with the broadband service. In one embodiment, usage data includes at least one of: location of the user; location of the broadband service associated with the user; Layer 3 data; or amount of data packets transmitted and received by the user over a broadband link associated with the broadband service.

In one embodiment, user preference data includes at least one of: throughput for a broadband link associated with the broadband service; stability of line associated with the broadband service; and delay of the line. In one embodiment, evaluating the collected data comprises: analyzing the collected data to determine whether a broadband line associated with the broadband service can be updated to a higher level of service.

In one embodiment, evaluating the collected data comprises: identifying whether the broadband service is capable of being upgraded or has to be downgraded. In one embodiment, identifying whether the broadband service is capable of being upgraded is performed when it is determined that validation records associated with a physical layer indicate that the physical layer achieves required data transfer rates. In one embodiment, identifying whether the broadband service is capable of being upgraded is performed when it is determined that back-haul capacity is not a limiting factor for service upgrades.

In one embodiment, evaluating the collected data comprises assigning a score according to at least one of: determination that a physical layer of the broadband service is stable; determination that a broadband line is stable using a different service product; determination that validation records associated with the physical layer indicate that the physical layer achieves target data transfer rates; and determination that back-haul capacity is not a limiting factor for service upgrades. In one embodiment, the method further comprises comparing the score to a threshold.

In one embodiment, validating the broadband service recommendations comprises: prioritizing some broadband lines for validation relative to a score. In one embodiment, the score is based on at least one of: availability of capacity in backhaul; price of service; quality of customer service; lines, associated with the broadband service, which lack validation records; lines, associated with the broadband service, with recent changes in equipment of service; lines, associated with the broadband service, that are more likely to request upgraded service; lines, associated with the broadband service, that are more likely to have higher up-sell potential; or lines, associated with the broadband service, with less accurate service recommendations.

In one embodiment, validating the broadband service recommendations comprises updating a parameter set associated with the broadband service. In one embodiment, updating the parameter set is done temporarily. In one embodiment, the method further comprises performing profile optimization in response to validating the broadband service, wherein profile optimization to adjust one or more parameters in a parameter set associated with the broadband service.

In one embodiment, validating the broadband service recommendations comprises: evaluating the broadband service in response to updating the service; collecting data associated with the broadband service in response to evaluating; checking results associated with the profile optimization in response to evaluating the broadband service and collecting the data; and restoring original broadband service to the user in response to checking results.

In one embodiment, the method further comprises applying a test profile to a broadband line associated with the broadband service to determine a type of service the broadband line is capable of handling. In one embodiment, the method further comprises: presenting the broadband service recommendations to the user of the broadband service.

In another example, a machine readable storage medium is provided having instructions stored thereon that, when executed, causes a machine to perform a method according to the embodiments discussed above.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A method for validating a broadband service for recommendation, the method comprising:
   collecting a first set of data associated with a broadband service related to a first service profile;
   prior to generating a service recommendation, using the first service profile to evaluate the first set of data to determine, at the least, a broadband service capacity;
   based on the broadband service capacity, generating a second service profile and collecting a second set of data associated with the second service profile; and
   generating the service recommendation; and
   using the second service profile to evaluate the broadband service capacity and validate the service recommendation.

2. The method of claim 1, wherein the broadband service is a DSL broadband service.

3. The method of claim 1, wherein collecting the first set of data comprises collecting by network monitoring tools DSL or Wi-Fi data.

4. The method of claim 3, wherein the DSL or Wi-Fi data includes at least one of:
   historical performance data;
   Digital Subscriber Line (DSL) operational data;
   SELT data;
   throughput data;
   Wi-Fi performance data;
   data collected when the user is shopping online using the broadband service;
   data collected when the user is browsing the Internet using the broadband service;
   data collected when the user is accessing video online using the broadband service;
   data collected when the user is participating in online gaming activities using the broadband service;
   data collected when the user is accessing cloud-based applications using the broadband service;
   data collected when the user is participating in a two-way communication using the broadband service;
   neighborhood configuration data; or
   data associated with services and recommendations of neighboring customers.

5. The method of claim 1, wherein collecting the first set of data is initiated by the user via a web-based tool.

6. The method of claim 1, wherein collecting the first set of data comprises at least one of collecting user preference data of and usage data associated with the broadband service.

7. The method of claim 6, wherein usage data comprises at least one of:
   location of the user;
   location of the broadband service associated with the user;
   Layer 3 data; or
   amount of data packets transmitted and received by the user over a broadband link associated with the broadband service.

8. The method of claim 6, wherein user preference data comprises at least one of:
   throughput for a broadband link associated with the broadband service;
   stability of line associated with the broadband service; and
   delay of the line.

9. The method of claim 6, wherein evaluating the collected data comprises:
   analyzing the collected data to determine whether a broadband line associated with the broadband service can be updated to a higher level of service.

10. The method of claim 6, wherein evaluating the collected data comprises:
    identifying whether the broadband service is capable of being upgraded or has to be downgraded.

11. The method of claim 10, wherein identifying whether the broadband service is capable of being upgraded is performed when it is determined that validation records associated with a physical layer indicate that the physical layer achieves required data transfer rates.

12. The method of claim 10, wherein identifying whether the broadband service is capable of being upgraded is performed in response to determining that back-haul capacity is not a limiting factor for service upgrades.

13. The method of claim 1, wherein evaluating the collected data comprises assigning a score according to at least one of:
    determination that a physical layer of the broadband service is stable;
    determination that a broadband line is stable using a different service product;
    determination that validation records associated with the physical layer indicate that the physical layer achieves target data transfer rates; and
    determination that back-haul capacity is not a limiting factor for service upgrades.

14. The method of claim 13 further comprises comparing the score to a threshold.

15. The method of claim 1, wherein validating the broadband service recommendations comprises:
prioritizing some broadband lines for validation relative to a score.

16. The method of claim 15, wherein the score is based on at least one of:
availability of capacity in backhaul;
price of service;
quality of customer service;
lines, associated with the broadband service, which lack validation records;
lines, associated with the broadband service, with recent changes in equipment of service;
lines, associated with the broadband service, that are more likely to request upgraded service;
lines, associated with the broadband service, that are more likely to have higher up-sell potential; or
lines, associated with the broadband service, with less accurate service recommendations.

17. The method of claim 1, wherein validating the broadband service recommendations comprises updating a parameter set associated with the broadband service.

18. The method of claim 17, wherein updating the parameter set is done temporarily.

19. The method of claim 1, further comprises performing profile optimization in response to validating the broadband service, wherein profile optimization to adjust one or more parameters in a parameter set associated with the broadband service.

20. The method of claim 19, wherein validating the broadband service recommendations comprises:
evaluating the broadband service in response to updating the service;
collecting data associated with the broadband service in response to evaluating;
checking results associated with the profile optimization in response to evaluating the broadband service and collecting the data; and
restoring original broadband service to the user in response to checking results.

21. The method of claim 1, further comprises applying a test profile to a broadband line associated with the broadband service to determine a type of service the broadband line is capable of handling.

22. The method of claim 1, further comprises:
presenting the broadband service recommendations to the user of the broadband service.

23. A non-transitory machine readable storage medium having instructions stored thereon that, when executed, causes a machine to perform an operation which comprises:
collecting a first set of data associated with a broadband service related to a first service profile;
prior to generating a service recommendation, using the first service profile to evaluate the first set of data to determine, at the least, a broadband service capacity;
based on the broadband service capacity, generating a second service profile and collecting a second set of data associated with the second service profile; and
generating the service recommendation; and
using the second service profile to evaluate the broadband service capacity and validate the service recommendation.

24. The non-transitory machine readable storage medium of claim 23, wherein the broadband service is a DSL broadband service.

* * * * *